US 6,888,831 B1

United States Patent
Hospodor et al.

(10) Patent No.: US 6,888,831 B1
(45) Date of Patent: May 3, 2005

(54) DISTRIBUTED RESOURCE RESERVATION SYSTEM FOR ESTABLISHING A PATH THROUGH A MULTI-DIMENSIONAL COMPUTER NETWORK TO SUPPORT ISOCHRONOUS DATA

(75) Inventors: Andrew D. Hospodor, Los Gatos, CA (US); Michael K. Eneboe, San Jose, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 903 days.

(21) Appl. No.: 09/675,850

(22) Filed: Sep. 28, 2000

(51) Int. Cl.[7] .......................... H04L 12/28; H04L 12/56
(52) U.S. Cl. ..................... 370/394; 370/468; 370/400
(58) Field of Search ........................... 370/229, 410, 370/230.1, 235, 236, 237, 238, 351–356, 400, 401, 395.41, 431, 468, 389, 394, 474, 465; 714/746, 747, 748, 749, 750

(56) References Cited

U.S. PATENT DOCUMENTS

| | | | |
|---|---|---|---|
| 5,581,703 A | | 12/1996 | Baugher et al. |
| 6,341,127 B1 | * | 1/2002 | Katsube et al. ............. 370/352 |
| 6,577,630 B1 | * | 6/2003 | Markwalter et al. ........ 370/392 |
| 6,628,629 B1 | * | 9/2003 | Jorgensen ................... 370/322 |
| 6,661,806 B1 | * | 12/2003 | Eriksson et al. ............ 370/468 |

OTHER PUBLICATIONS

Alistair Croll and Eric Packman, "Managing Bandwidth—Deploying QOS in Enterprise Networks", Prentice Hall, Upper Saddle River, NJ, pp. 14–15, 217–305, 1999.

(Continued)

*Primary Examiner*—Ajit Patel
(74) *Attorney, Agent, or Firm*—Milad G. Shara, Esq.; Howard H. Sheerin, Esq.

(57) ABSTRACT

A distributed method of establishing a path in a multi-dimensional computer network comprising a plurality of nodes for transmitting isochronous data from a source node to a destination node is disclosed. A request packet is injected into the network, the request packet specifying a request to transmit the isochronous data from one of a plurality of source nodes. The request packet is routed to at least one the plurality of source nodes, and the source node determines whether it has sufficient resources to support transmitting the isochronous data. If the source node comprises sufficient resources to support transmitting the isochronous data, the source node reserves resources within the source node to support transmitting the isochronous data, and transmits an ack packet from the source node to a first neighboring node. The first neighboring node determines whether it has sufficient resources to support transmitting the isochronous data. If the first neighboring node comprises sufficient resources to support transmitting the isochronous data, the first neighboring node reserves resources within the first neighboring node to support transmitting the isochronous data, and transmits the ack packet to an adjacent node. If the first neighboring node does not comprise sufficient resources to support transmitting the isochronous data, the first neighboring node transmits a nack packet to the source node and the source node transmits the ack packet to a second neighboring node.

29 Claims, 8 Drawing Sheets

OTHER PUBLICATIONS

Jose Duato, Sudhakar Yalamanchili, Lionel Ni, "Interconnection Networks An Engineering Approach", IEEE Computer Society Press, pp. 35–106, 1997, ISBN 0–8186–7800–3.

InfiniBand Architecture Release 0.9, vol. 1—General Specfications, pp. 47–51; Mar. 31, 2000.

D. D. Kandlur, K. G. Shin, D. Ferrari, "Real–Time Communication in Multihop Networks", IEEE Transactions on Parallel and Distributed Systems, vol. 5, No. 10, pp. 1044–1056, Oct. 1994.

W.C. Lee, M.G. Hiuchi, and P.A. Humblet, "Routing Subject to Quality of Service Constraints in Integrated Communication Networks", IEEE Network, pp. 46–55, Jul./Aug. 1995.

J. Rexford, J. Hall, K. G. Shin, "A Router Architecture for Real–Time Communication in Multicomputer Networks", IEEE Transactions on Computers, vol. 47, No. 10, pp. 1088–1101, Oct. 1998.

J. Rexford, J. Dolter and K. G. Shin, "Hardware Support for Controlled Interaction of Guaranteed and Best–Effort Communication", Proceedings of the Workshop on Parallel and Distributed Real–Time Systems, pp. 188–193, Apr. 1994.

D.D. Kandlur and K.G. Shin, "Traffic Routing for Multi–Computer Networks with Virtual Cut–Through Capability", Proc. 10th Int. Conf. Distributed Computing Systems, 1990, pp. 398–405.

J. Rexford and K. G. Shin, "Support for Multiple Classes of Traffic in Multicomputer Routers", Proceedings of the Workshop on Parallel Computer Routing and Communication, pp. 116–130, May 1994.

\* cited by examiner

DISTRIBUTED RESOURCE RESERVATION SYSTEM FOR ESTABLISHING A PATH THROUGH A MULTI-DIMENSIONAL COMPUTER NETWORK TO SUPPORT ISOCHRONOUS DATA

CROSS REFERENCE TO RELATED APPLICATIONS AND PATENTS

This application is related to co-pending patent application Ser. No. 09/542,954 entitled "METHOD FOR DESIGNATING ONE OF A PLURALITY OF ADDRESSABLE STORAGE DEVICES TO PROCESS A DATA TRANSFER REQUEST" filed on Mar. 31, 2000, the disclosure of which is incorporated herein by reference.

BACKGROUND OF THE INVENTION

1. Field of the Invention

The present invention relates to computer networks. More particularly, the present invention relates to a distributed resource reservation system for establishing a path through a multi-dimensional computer network to support isochronous data.

2. Description of the Prior Art

Establishing a path through a network to handle isochronous traffic has in the past been managed by a central routing processor which evaluates the state of the network and reserves resources in a path from a destination to source node. The resources are reserved in a manner that guarantees a delivery time for the isochronous data. However, the central processor may require a significant amount of memory and processing power to evaluate the network and reserve resources to establish paths in an efficient and timely manner. Further, as the network grows, so must the memory and processing capabilities of the central server. Thus, centrally managed schemes do not scale well.

Figure 1A:
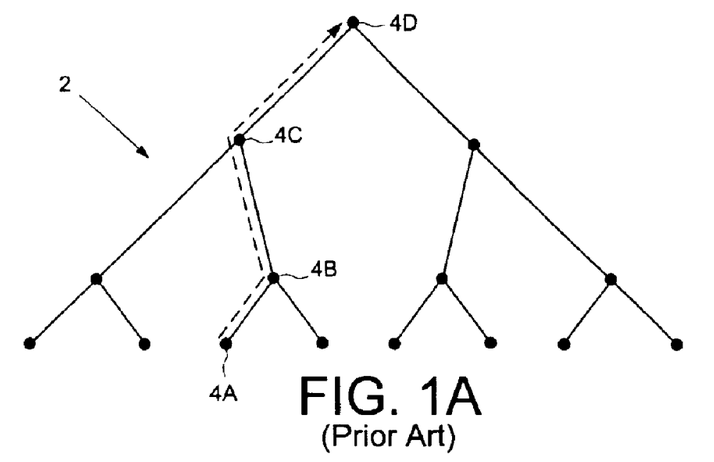
FIG. 1A illustrates the prior art resource reservation protocol (RSVP) wherein each node in a network tree comprises reservation facilities for establishing isochronous data paths.
Figure 1B:
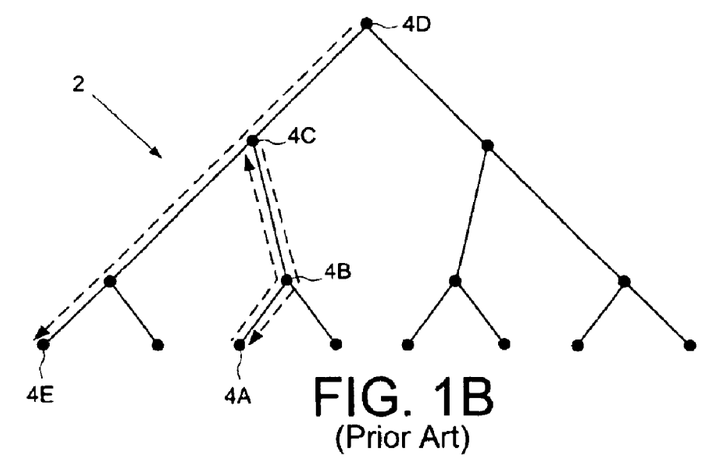
FIG. 1B illustrates how in the RSVP protocol a previously established path can block requests to create new paths.

The Resource Reservation Protocol or RSVP protocol is a prior art method for reserving resources to support isochronous traffic in a network wherein the resource reservation facility is distributed throughout the nodes of the network (see the Resource Reservation Protocol or RSVP an overview for which is provided in the text book *Managing Bandwidth—Deploying QOS in Enterprise Networks*, by Alistair Croll and Eric Packman, Prentice Hall, Upper Saddle River, N.J., 1999; and "Resource Reservation Protocol (RSVP)—Version 1 Functional Specification", Braden, R., Zhang, L., Berson, S., Herzog, S., Jamin, S., RFC 2205, September 1997, Proposed Standard). The RSVP protocol is illustrated in FIG. 1A which shows a prior art tree network 2 comprising a plurality of nodes wherein a destination node reserves resources in a path toward a source node. In FIG. 1A, node 4A sends a request packet into the network 2 to receive isochronous data from node 4D. As the request packet travels through the network 2, each node in the path (e.g., node 4B and 4C) determines whether it has sufficient resources to service the request and then reserves the resources. FIG. 1B shows a scenario when node 4C cannot service a request from node 4A due to resources having already been reserved to service a request from node 4E. Node 4C sends a reply message to node 4A indicating that the request cannot be serviced. Node 4A must then wait until node 4C has regained sufficient resources to service the request (e.g., when node 4E relinquishes the resources reserved in node 4C). This blocking characteristic of busses and tree networks implementing the RSVP protocol can reduce the aggregate performance of the network, particularly during high traffic periods.

There is, therefore, a need to establish paths for isochronous data in a computer network in a cost effective manner which scales efficiently with the size of the computer network and which avoids the blocking characteristic of the RSVP protocol.

SUMMARY OF THE INVENTION

The present invention may be regarded as a distributed method of establishing a path in a multi-dimensional computer network comprising a plurality of nodes for transmitting isochronous data from a source node to a destination node. A request packet is injected into the network, the request packet specifying a request to transmit the isochronous data from one of a plurality of source nodes. The request packet is routed to at least one of the plurality of source nodes, and the source node determines whether it has sufficient resources to support transmitting the isochronous data. If the source node comprises sufficient resources to support transmitting the isochronous data, the source node reserves resources within the source node to support transmitting the isochronous data, and transmits an acknowledge (ack) packet from the source node to a first neighboring node. The first neighboring node determines whether it has sufficient resources to support transmitting the isochronous data. If the first neighboring node comprises sufficient resources to support transmitting the isochronous data, the first neighboring node reserves resources within the first neighboring node to support transmitting the isochronous data, and transmits the ack packet to an adjacent node. If the first neighboring node does not comprise sufficient resources to support transmitting the isochronous data, the first neighboring node transmits a negative-acknowledge (nack) packet to the source node and the source node transmits the ack packet to a second neighboring node.

In one embodiment, the resources reserved within a node comprises memory for buffering data, and in another embodiment the resources comprises network communication circuitry, such as a virtual lane in switching circuitry.

In another embodiment, the resources are reserved within a node for a specified "lease" period, after which time the resources are automatically relinquished. In yet another embodiment, the resources are automatically relinquished if they remain idle for a specified "time-out" period.

In still another embodiment, the request is routed from the destination node to a plurality of source nodes and a method is employed to determine which source node will service the request. In one embodiment, the request packet is transmitted to a primary source node, the primary source node determines whether it has sufficient resources to service the request and, if not, the primary source node transmits the request packet to a secondary source node. In another embodiment, the request packet is multicast to a plurality of source nodes, at least two of the source nodes reserves resources to support transmitting the isochronous data, and one of the reservations is canceled when a path constructed from the source node encounters a path which has already reserved resources to support transmitting the isochronous data.

The present invention may also be regarded as a switched node comprising switching circuitry including more than two bi-directional ports for simultaneously transmitting data in multiple dimensions through a computer network, wherein each bi-directional port comprises an input port and an output port. The switched node further comprises a data buffer for buffering data, routing circuitry for routing data stored in the data buffer to a selected output port, and a reservation facility for reserving resources within the switch node to support requests to transmit isochronous data. The switched node receives a request packet to reserve resources to support transmitting isochronous data. If the switched node comprises sufficient resources to support transmitting the isochronous data, the reservation facility reserves resources within the switched node to support transmitting the isochronous data, and the switched node transmits an ack packet to a first neighboring node. If the first neighboring node does not comprise sufficient resources to support transmitting the isochronous data, the switched node receives a nack packet from the first neighboring node, and the switched node transmits the ack packet to a second neighboring node.

In one embodiment, the switched node further comprises a disk for storing data and a head actuated over the disk for writing data to and reading data from the disk. In one embodiment, the reservation facility reserves resources associated with data read from the disk and written to the disk.

DESCRIPTION OF THE PREFERRED EMBODIMENTS

Figure 2A:
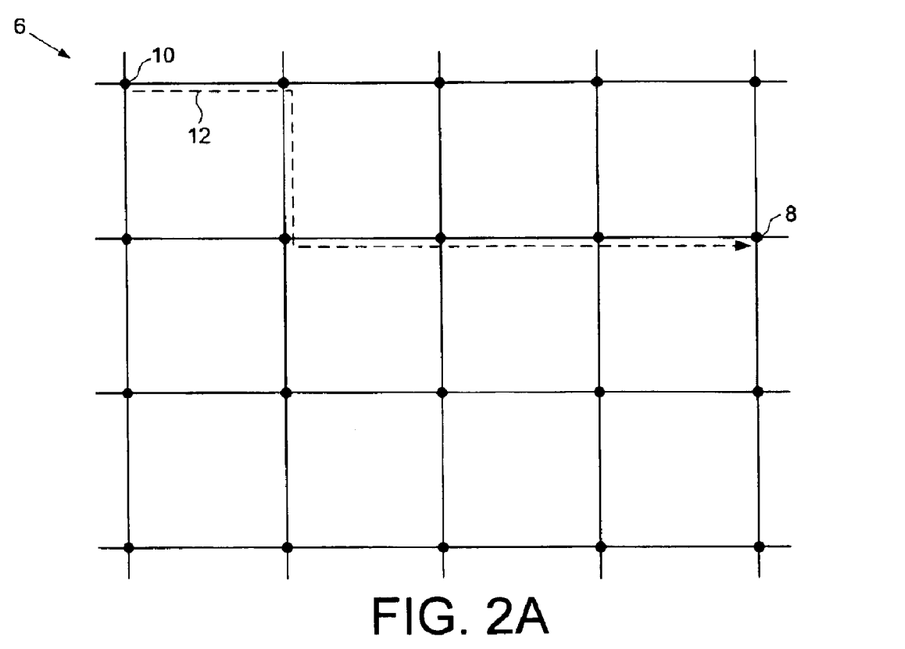
FIG. 2A illustrates a distributed resource reservation system according to an embodiment of the present invention wherein a request to transmit isochronous data is sent to a source node in a multi-dimensional computer network.
Figure 2B:
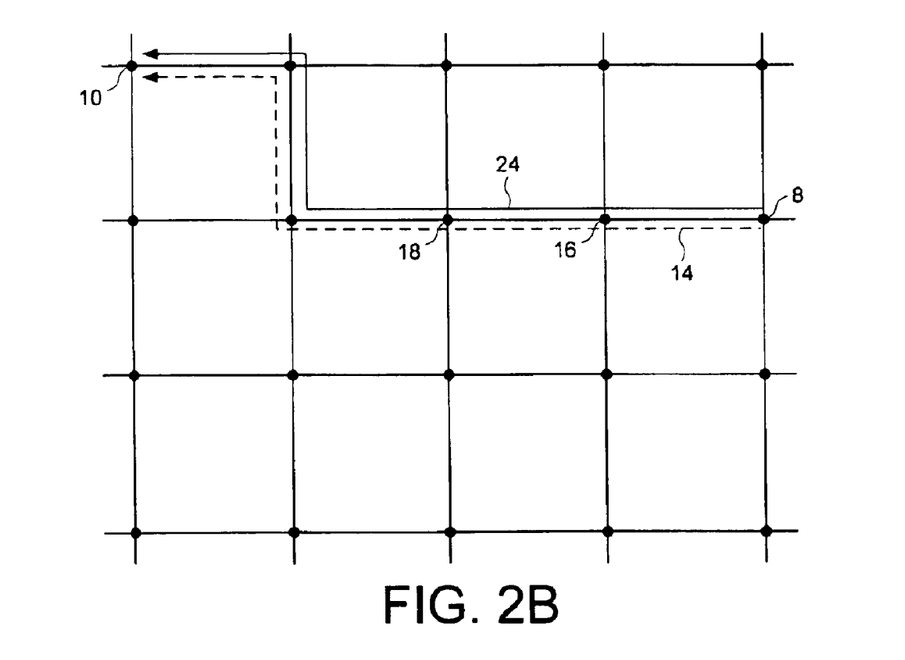
FIG. 2B illustrates how the source node of FIG. 2A generates an acknowledge (ack) packet which is transmitted back to the destination node along a path wherein resources are reserved at each node to support transmission of the isochronous data.
Figure 2C:
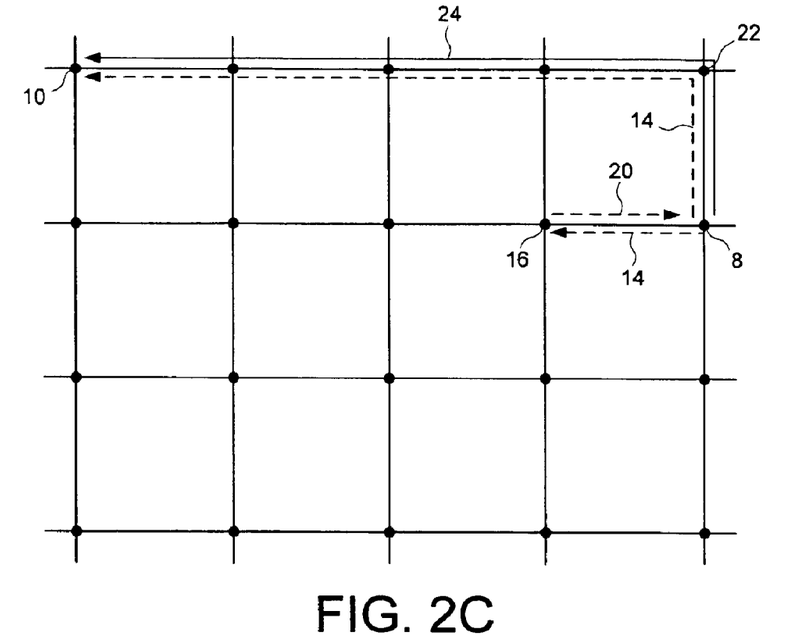
FIG. 2C shows how a path is redirected around a node which does not have sufficient resources to handle the isochronous data.

FIGS. 2A–2C illustrates a distributed method of establishing a path in a multi-dimensional computer network 6 comprising a plurality of nodes for transmitting isochronous data from a source node 8 to a destination node 10 according to an embodiment of the present invention. A request packet 12 is injected into the network, the request packet 12 specifying a request to transmit the isochronous data from one of a plurality of source nodes. The request packet is routed to at least one of the plurality of source nodes 8, and the source node 8 determines whether it has sufficient resources to support transmitting the isochronous data. If the source node 8 comprises sufficient resources to support transmitting the isochronous data, the source node 8 reserves resources within the source node 8 to support transmitting the isochronous data, and transmits an acknowledge (ack) packet 14 from the source node 8 to a first neighboring node 16 as shown in FIG. 2B. The first neighboring node 16 determines whether it has sufficient resources to support transmitting the isochronous data. If the first neighboring node 16 comprises sufficient resources to support transmitting the isochronous data, the first neighboring node 16 reserves resources within the first neighboring node 16 to support transmitting the isochronous data, and transmits the ack packet 14 to an adjacent node 18. As shown in FIG. 2C, if the first neighboring node 16 does not comprise sufficient resources to support transmitting the isochronous data, the first neighboring node 16 transmits a negative-acknowledge (nack) packet 20 to the source node 8 and the source node 8 transmits the ack packet 14 to a second neighboring node 22.

In one embodiment, the request packet 12 specifies certain Quality-of-Service (QOS) constraints associated with the isochronous data (e.g., transmission latency and data rate). The nodes within the network 6 determine whether they have sufficient resources to support the QOS constraints. Once a path 24 has been established between the source node 8 and the destination node 10, the reserved resources guarantees that the isochronous data is transmitted through the path 24 in a manner that satisfies the specified QOS constraints.

In the embodiment of FIG. 2A, the request packet 12 is injected into the network 6 by the destination node 10. In alternative embodiment, the request packet 12 may be injected into the network 6 by a third party node which requests that the isochronous data be delivered to the destination node 10.

When the source node 8 finishes transmitting the isochronous data to the destination node 10, the path 24 reserved for the data transfer is torn down by relinquishing the resources reserved at each node through the path. In one embodiment illustrated in FIG. 2D, the source node 8 transmits a termination packet 26 through the path 24 after transmitting the last packet associated with the isochronous data. As the termination packet 26 reaches each node in the path 24, the nodes relinquish the resources reserved for the isochronous data.

Figure 2D:
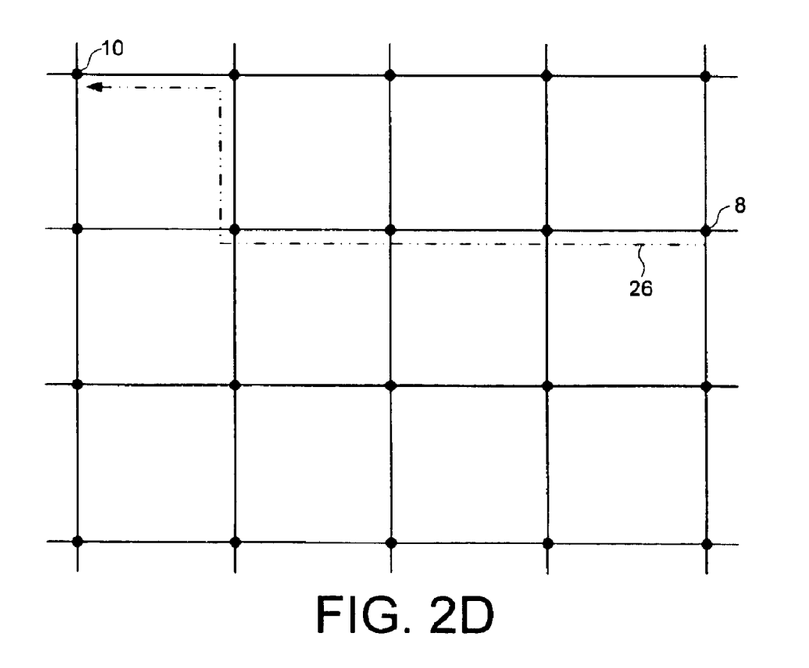
FIG. 2D shows how the path established in FIG. 2B is torn down by transmitting a termination packet through the path from the source node to the destination node.

In another embodiment, the destination node specifies a "lease" period for the resources reserved within the nodes, and the resources are automatically relinquished when the lease period expires. In yet another embodiment, a time-out period is associated with the resources reserved within the nodes and the resources are automatically relinquished if they remain idle beyond the time-out period. This embodiment prevents blocking of resources under failure conditions, such as the source node 8, the destination node 10, or an intermediate node within the path failing. In yet another embodiment, the destination node 10 may intentionally terminate the transmission early by sending a termination packet through the path which also relinquishes the resources reserved for the isochronous data.

Figure 3A:
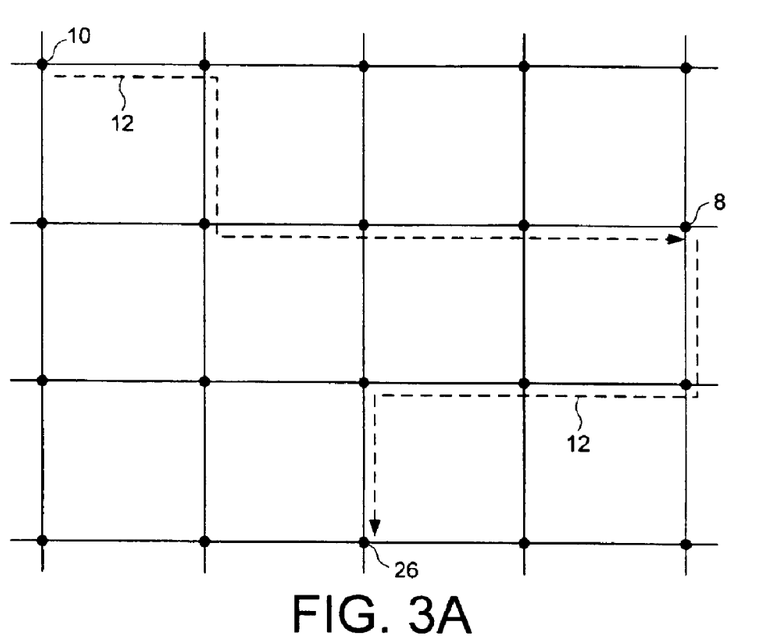
FIG. 3A shows an embodiment of the present invention wherein the request to receive the isochronous data is forwarded to a secondary source node if a primary source node does not comprise sufficient resources to service the request.
Figure 3B:
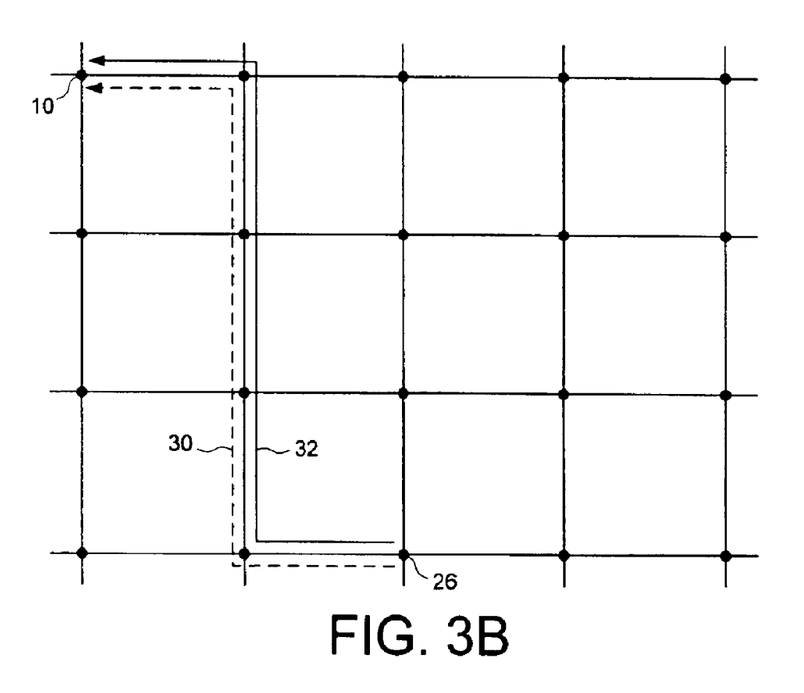
FIG. 3B shows the path established by the secondary source node of FIG. 3A used to transmit the isochronous data.
Figure 4A:
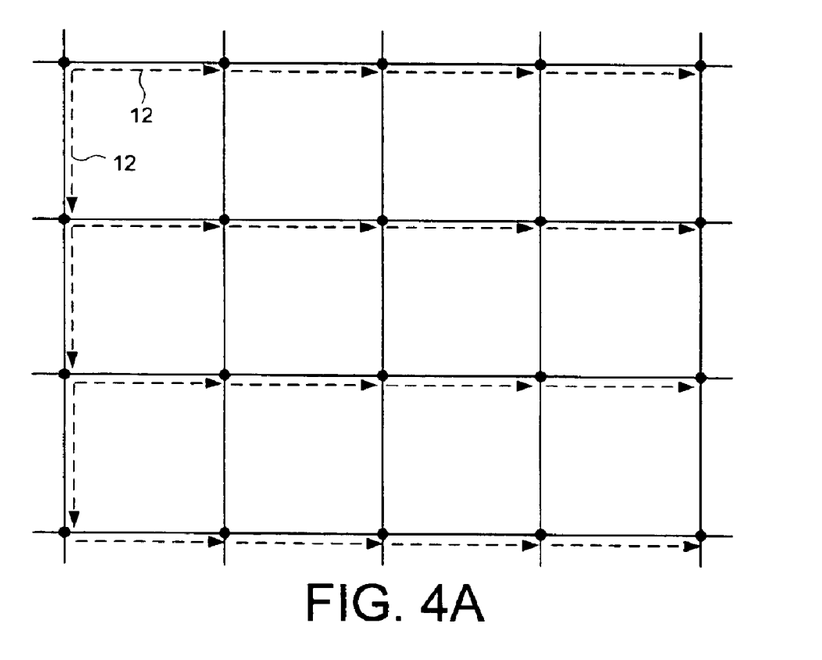
FIG. 4A shows an embodiment of the present invention wherein the request to receive the isochronous data is multicast to a plurality of nodes in the multi-dimensional computer network.
Figure 4B:
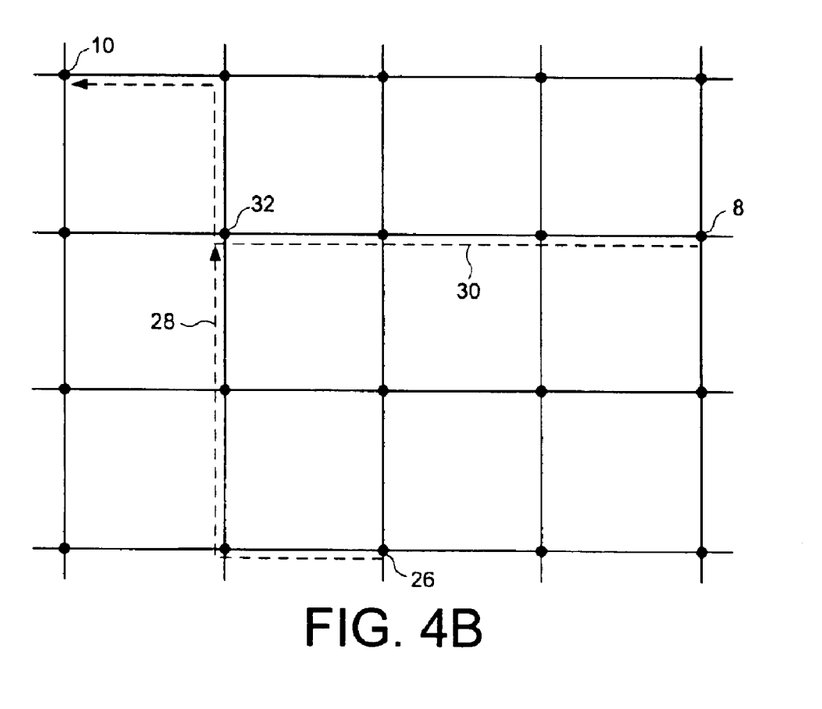
FIG. 4B shows two source nodes reserving resources through two paths toward the destination node to support transmitting of the isochronous data.
Figure 4C:
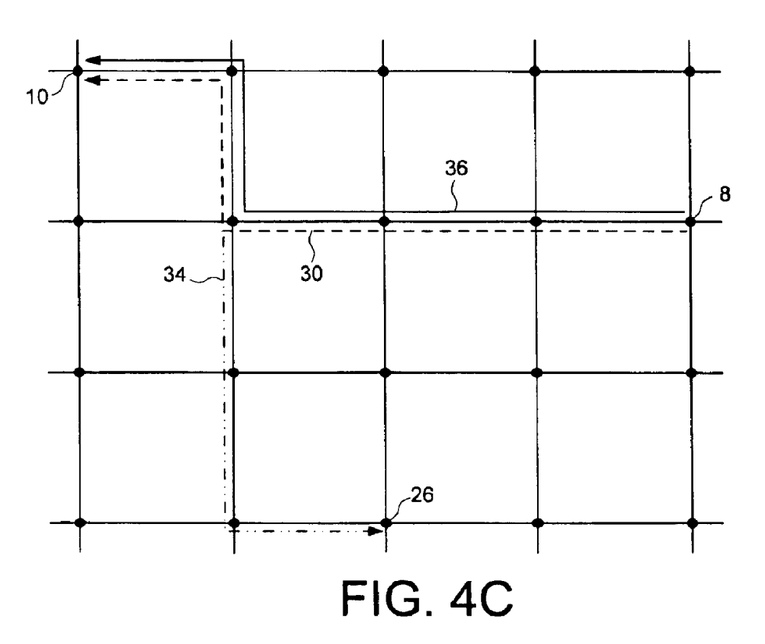
FIG. 4C illustrates how one of the paths in FIG. 4B is torn down when a node is encountered which has already reserved resources to support transmitting the isochronous data through an alternative path.

FIG. 3A shows an embodiment of the present invention wherein the request packet 12 is first transmitted to a primary source node 8 which determines whether it comprises sufficient resources to support transmitting the isochronous data. If the primary source node 8 does not comprise sufficient resources, then the request packet 12 is forwarded to a secondary node 26 comprising a replicate of the data stored on the primary source node 8. If the secondary node 26 has sufficient resources, then it sends an ack packet 30 (FIG. 3B) through nodes in the network to establish a path 32 for the isochronous data. In one embodiment, the primary source node 8 stores information identifying the secondary source node 26 to which the request packet 12 is forwarded. In an alternative embodiment, the request packet 12 comprises information identifying the secondary source node FIG. 4A illustrates an embodiment of the present invention wherein the request packet 12 is multicast to a plurality of source nodes in the network attempting to find at least one source node comprising sufficient resources to support transmitting the isochronous data. In one embodiment shown in FIG. 4B, resources are reserved in multiple paths through the network. In the example of FIG. 4B, source nodes 8 and 26 both comprise sufficient resources to support transmitting the isochronous data. Both source nodes 8 and 26 reserve resources and begin to establish a first path and a second path toward the destination node 10 by transmitting a first ack packet 28 and a second ack packet 30 through the network. When the first ack packet 28 reaches a node 32 comprising resources already reserved to support transmitting the isochronous data through the second path, the resources reserved in the first path are relinquished. In one embodiment shown in FIG. 4C, the ack packet 28 is converted into a cancel packet 34 which is transmitted back toward the source node 26 relinquishing the resources reserved at each node. The isochronous data is then transmitted through the path 36 established by source node 8.

In an alternative embodiment, the request packet 12 is multicast to a plurality of source nodes and a facility is provided to select from the multiple source nodes that comprise sufficient resources to support transmitting the isochronous data. For example, the source nodes may communicate with one another or with a central processor to determine the most appropriate source node to service the request. The above reference co-pending patent application entitled "METHOD FOR DESIGNATING ONE OF A PLURALITY OF ADDRESSABLE STORAGE DEVICES TO PROCESS A DATA TRANSFER REQUEST" discloses further details of this embodiment.

Figure 5:
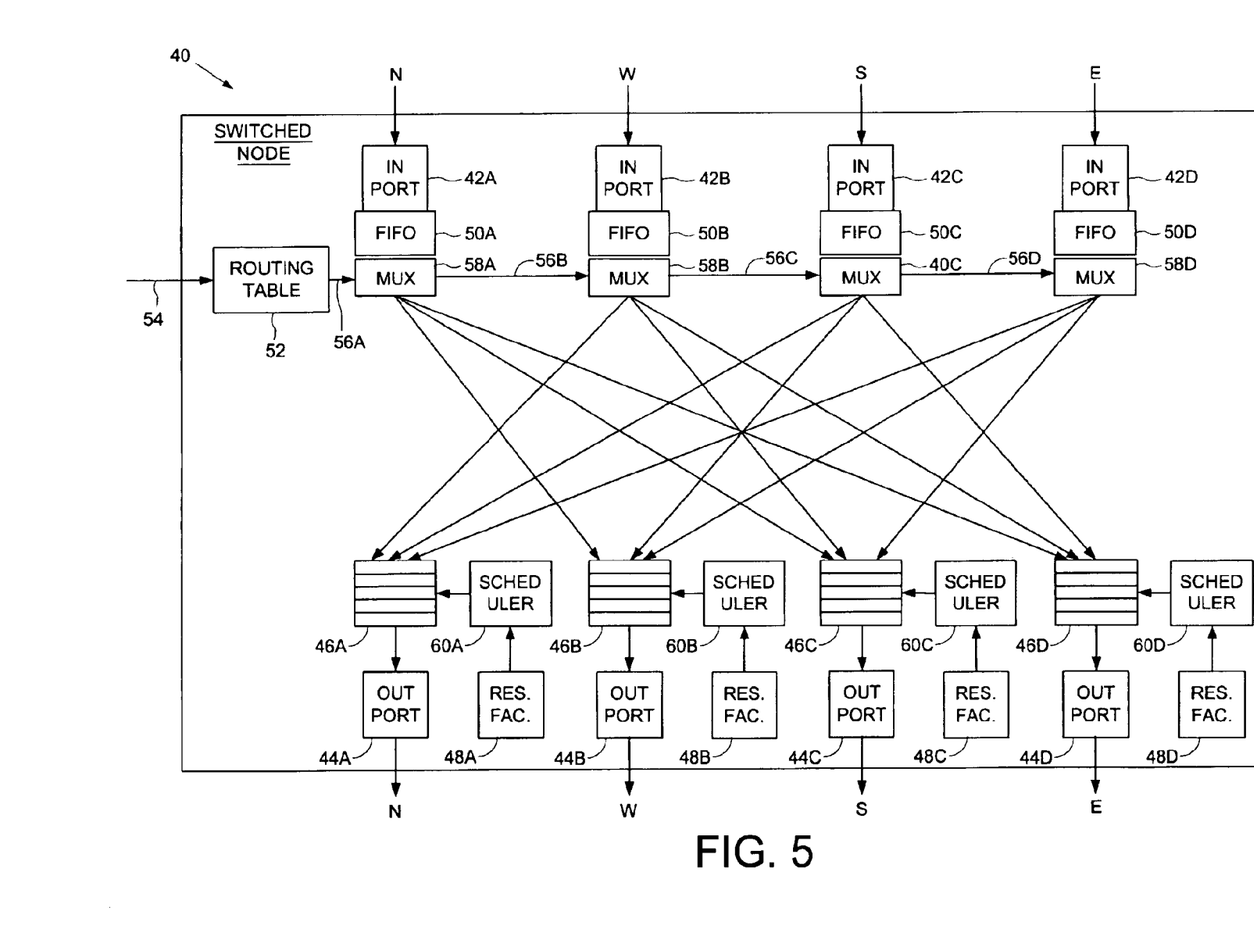
FIG. 5 shows a switched node for use in a multi-dimensional switched fabric computer network according to an embodiment of the present invention comprising a plurality of bi-directional ports for simultaneously transmitting data in multiple dimensions, a data buffer for buffering data, routing circuitry for routing the data from the data buffer to the appropriate output ports, and a reservation facility for reserving resources within the switch node to support requests to transmit isochronous data.

FIG. 5 shows a switched node 40 for use in a multi-dimensional computer network according to an embodiment of the present invention. The switched node 40 comprises switching circuitry comprising more than two bi-directional ports for simultaneously transmitting data in multiple dimensions through the computer network, wherein each bi-directional port comprises an input port 42A–42D and an output port 44A–44D, a data buffer 46A–46D for buffering data, routing circuitry for routing data stored in the data buffer to a selected output port 44A–44D, and a reservation facility 48A–48D for reserving resources within the switch node 40 to support requests to transmit isochronous data. The switched node 40 receives a request packet to reserve resources to support transmitting isochronous data. If the switched node 40 comprises sufficient resources to support transmitting the isochronous data, the reservation facility 48A–48D reserves resources within the switched node 40 to support transmitting the isochronous data, and the switched node 40 transmits an ack packet to a first neighboring node. If the first neighboring node does not comprise sufficient resources to support transmitting the isochronous data, the switched node 40 receives a nack packet from the first neighboring node, and the switched node 40 transmits the ack packet to a second neighboring node.

The switched node 40 of FIG. 5 is interconnected with a plurality of other switched nodes such as shown in FIG. 2A to form a multi-dimensional switched fabric. Each of the switched nodes in FIG. 2A comprises four bi-directional ports (North, East, South and West) forming a two-dimensional fabric. In one embodiment, the network data transmitted through the switched nodes consist of packets having a packet header comprising routing data which identifies the destination node for the packet. The packet headers are processed in order to route the packet through the switched nodes. A suitable routing algorithm generates control data for configuring the switched nodes in order to route the packets through the network. Any suitable routing algorithm may be employed, and it may support Unicast, Multicast, or Broadcast delivery mechanisms. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "Interconnection Networks, an Engineering Approach", IEEE Computer Society, 1997.

The routing algorithm is implemented a layer "above" the switching layer, and thus the routing algorithm may be compatible with various different switching algorithms, for example, Virtual Cut-Through Switching, Wormhole Switching, and Mad Postman Switching. In addition, topologies other than the two-dimensional switched fabric of FIG. 2A, as well as topologies comprising more than two dimensions, may be employed in the present invention by decreasing or increasing the number of bi-directional ports per switched node. Various topologies and switching algorithms which may be employed in the embodiments of the present invention are discussed in the aforementioned textbook by Jose Duato et al.

Referring again to FIG. 5, the bi-directional ports of the switched node 40 comprise four input ports 42A–42D and four output ports 44A–44D corresponding to the North, East, South and West ports shown in FIG. 2A. Data packets received from the input ports 42A–42D are buffered in FIFO buffers 50A–50D. A routing table 52 is configured by control data 54 which in one embodiment is generated by a central routing microprocessor. The routing table 52 generates control signals 56A–56D which configure multiplexers 58A–58D in order to route the data packets to appropriate data buffers 46A–46D associated with the output ports 44A–44D. In this manner, the data packets cross the switched node 40 immediately except for the delay of the FIFO buffer 50A–50D. The FIFO buffers 50A–50D provide buffering of input data in the event that the target data buffer 46 is full or busy receiving data from another of the input ports.

A scheduling facility 60A–60D is also provided within the switched node 40 which schedules the time when the data packets are to be transferred from the data buffers 46A–46D to the output ports 44A–44D. In one embodiment, the timing information for the packets are stored in the packet headers and processed by the scheduling facility 60A–60D. In one embodiment, the timing information implements an isochronous communication protocol such as disclosed in the in Texas Instruments' TSB12LV41A link-layer controller (LLC) which supports the IEEE 1394 specification for high-performance serial bus with automatic generation of the common isochronous packet headers and time stamping as required by the IEC 61883 standard.

In one embodiment, the data buffers 46A–46D comprise a plurality of virtual lanes where each virtual lane is assigned a predetermined priority level. The scheduling facility 60A–60D schedules the data packets according to the timing information by queuing the data packets in the appropriate virtual lanes. For example, data packets with shorter transmission deadlines are queued in higher priority virtual lanes, whereas data packets with longer transmission deadlines are queued in lower priority virtual lanes. In addition, within a virtual lane the data packets can be queued in order of arrival (FIFO) or in order of departure based on the transmission deadlines in order to support predetermined QOS constraints. Details of departure queuing are disclosed by Jennifer Rexford, et al. in "A Router Architecture for Real-Time Communication in Multicomputer Networks", *IEEE Transactions on Computers*, Vol. 47, No. 10, October 1998, which is incorporated herein by reference.

In one embodiment, the reservation facility 48A–48D reserves one or more of the virtual lanes for transmitting isochronous data. In another embodiment, the reservation facility 48A–48D reserves memory in data buffers 46A–46D for transmitting isochronous data. In yet another embodiment, the reservation facility 48A–48D reserves processing circuitry used to implement the routing and scheduling operations within the switched node 40. In still another embodiment, the reservation facility 48A–48D reserves bandwidth of linking circuitry for linking the switched node 40 to other switched nodes in the computer network.

The switched node of 40 of FIG. 5 can be extended to add additional dimensionality by duplicating the circuitry associated with each bi-directional port (input port 42, FIFO 50, MUX 58, output port 44, etc.). In one embodiment, the switched node 40 is a commodity device which comprises a facility for dynamically configuring the bi-directional ports to support a desired switched fabric topology. Thus, a number of the input ports 42A–42D and/or a number of the output ports 44A–44D may be configured to connect to ports of other switched nodes, whereas the remaining ports may be left unconnected.

Figure 6:
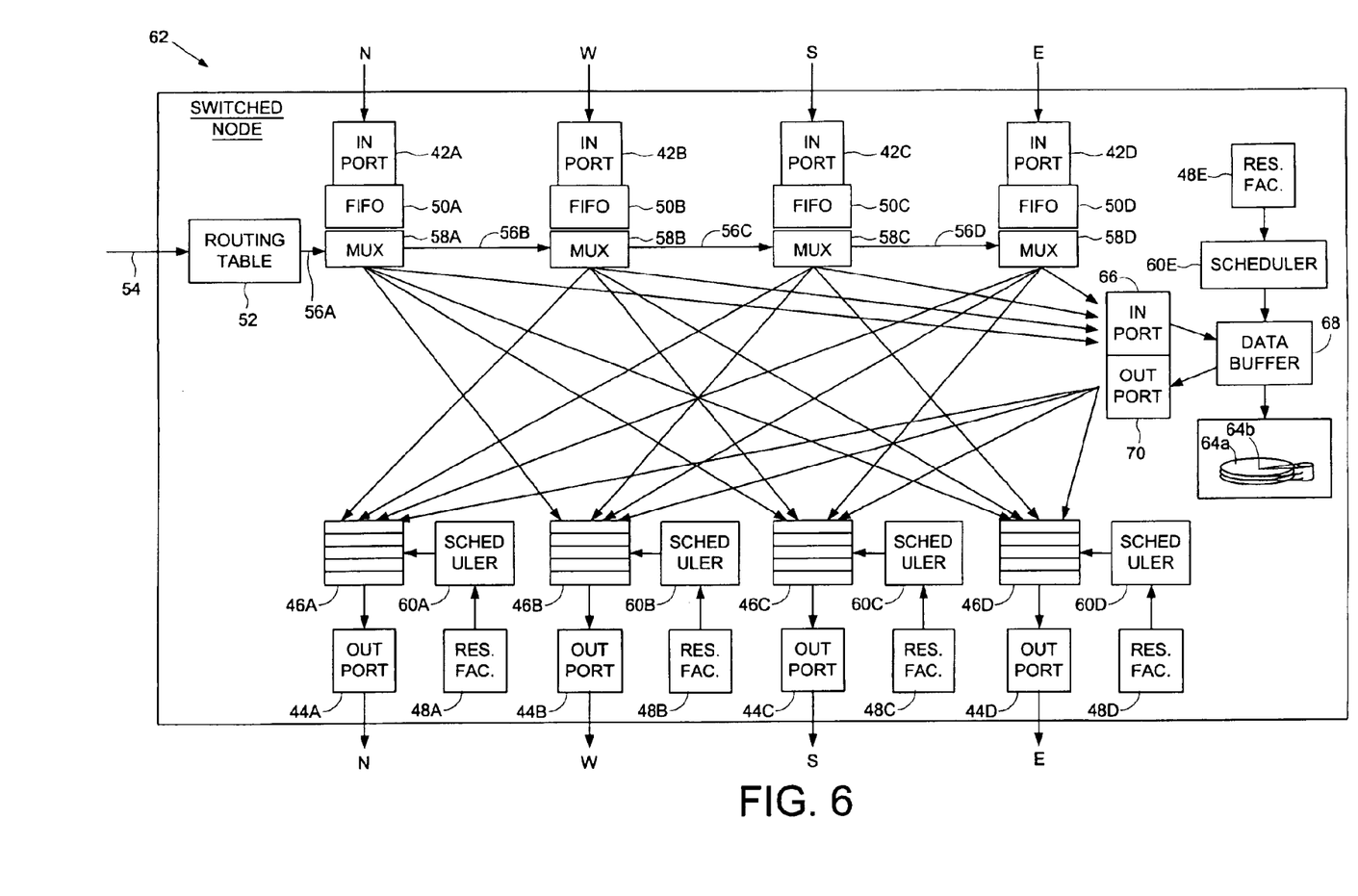
FIG. 6 shows the switched node of FIG. 5, further comprising a disk for storing data and a head actuated over the disk for writing data to and reading data from the disk, and a reservation facility for reserving resources associated with data read from the disk and written to the disk.

FIG. 6 shows a switched node 62 for use in a multi-dimensional computer network according to an alternative embodiment of the present invention wherein a disk 64a and a head 64b are integrated into the switched node 62 for storing isochronous data. The data packets received from the input ports 42A–42D may be routed to an input port 66 associated with the disk 64a and the head 64b, where the data is stored in data buffer 68, and ultimately written onto the disk 64a. Data read from the disk 64a is also stored in the data buffer 68 and transmitted via output port 70 to the appropriate data buffer 46A–46D.

In the embodiment of FIG. 6, the reservation facility 48A–48D within the switched node 62 reserves resources associated with the scheduling facility 60A–60D to support transmitting isochronous data through the switched node 62, and a reservation facility 48E reserves resources associated with a scheduling facility 60E to support isochronous data transmitted to and from the disk 64a. The scheduling facility 60E also comprises additional resources for implementing the interface between the data buffer 68 and the disk 64a. In one embodiment, the reservation facility 48E reserves memory within the data buffer 68 to support writing isochronous data to the disk 64a or to support reading isochronous data from the disk 64a. In yet another embodiment, the reservation facility 48E limits movement of the head 64b with respect to the disk 64a so as to constrain the head 64b to a predetermined region of the disk 64a, thereby reserving a resource within the switched node 62.

In the embodiment shown in FIG. 2A, the switched nodes constituting the multi-dimensional computer network 6 may or may not comprise a disk 64a and a head 64b as shown in FIG. 6. In addition, in one embodiment a select number of the switched nodes comprise adapter circuitry for connecting to an external entity (e.g., a client computer). In yet another embodiment, a select number of the switched nodes comprise a microprocessor for implementing a distributed routing algorithm.

We claim:

1. A distributed method of establishing a path in a multi-dimensional computer network comprising a plurality of nodes for transmitting isochronous data from a source node to a destination node, the method comprising the steps of:

(a) injecting a request packet into the network, the request packet specifying a request to transmit the isochronous data from one of a plurality of source nodes;

(b) routing the request packet to at least one of the plurality of source nodes;

(c) determining whether the source node comprises sufficient resources to support transmitting the isochronous data;

(d) if the source node comprises sufficient resources to support transmitting the isochronous data, reserving resources within the source node to support transmitting the isochronous data, and transmitting an acknowledge (ack) packet from the source node to a first neighboring node;

(e) determining whether the first neighboring node comprises sufficient resources to support transmitting the isochronous data;

(f) if the first neighboring node comprises sufficient resources to support transmitting the isochronous data, reserving resources within the first neighboring node to support transmitting the isochronous data, and transmitting the ack packet from the first neighboring node to a node adjacent the first neighboring node; and (g) if the first neighboring node does not comprise sufficient resources to support transmitting the isochronous data:

transmitting a negative-acknowledge (nack) packet from the first neighboring node to the source node; and transmitting the ack packet from the source node to a second neighboring node.

2. The distributed method of establishing a path in a multi-dimensional computer network as recited in claim 1, wherein the resources comprise memory for buffering data.

3. The distributed method of establishing a path in a multi-dimensional computer network as recited in claim 1, wherein the resources comprise network communication circuitry.

4. The distributed method of establishing a path in a multi-dimensional computer network as recited in claim 3, wherein:

(a) the network circuitry comprises multi-port switching circuitry comprising a plurality of virtual lanes; and (b) the resources comprise at least one of the virtual lanes.

5. The distributed method of establishing a path in a multi-dimensional computer network as recited in claim 1, further comprising the step of routing the request packet to a plurality of source nodes.

6. The distributed method of establishing a path in a multi-dimensional computer network as recited in claim 5, wherein the step of routing the request packet to a plurality of source nodes comprises the steps of:

(a) transmitting the request packet to a primary source node;

(b) determining whether the primary source node comprises sufficient resources to support transmitting the isochronous data; and (c) if the primary source node does not comprise sufficient resources to support transmitting the isochronous data, forwarding the request packet to a secondary source node.

7. The distributed method of establishing a path in a multi-dimensional computer network as recited in claim 5, wherein the step of routing the request packet to a plurality of source nodes further comprises the steps of:

(a) multicasting the request packet to the plurality of source nodes;

(b) determining whether each of the plurality of source nodes comprises sufficient resources to support transmitting the isochronous data; and (c) reserving resources in at least two of the plurality of source nodes to support transmitting the isochronous data.

8. The distributed method of establishing a path in a multi-dimensional computer network as recited in claim 7, further comprises the step of relinquishing the resources reserved in one of the source nodes.

9. The distributed method of establishing a path in a multi-dimensional computer network as recited in claim 5, wherein the step of routing the request packet to a plurality of source nodes further comprises the steps of:

(a) multicasting the request packet to the plurality of source nodes;

(b) determining whether each of the plurality of source nodes comprises sufficient resources to support transmitting the isochronous data;

(a) reserving resources in a first path of nodes between a first source node and the destination node;

(b) reserving resources in a second path of nodes between a second source node and the destination node; and (c) relinquishing the resources reserved in the first path of nodes.

10. The distributed method of establishing a path in a multi-dimensional computer network as recited in claim 8, further comprising the step of relinquishing the resources reserved in the first path of nodes when a node is reached comprising resources reserved to support transmitting the isochronous data through the second path of nodes.

11. The distributed method of establishing a path in a multi-dimensional computer network as recited in claim 1, wherein the request packet comprises a lease period, further comprising the step of relinquishing the reserved resources when the lease period expires.

12. The distributed method of establishing a path in a multi-dimensional computer network as recited in claim 1, further comprising the steps of:

(a) associating a time-out period with the reserved resources; and (b) automatically relinquishing the reserved resources if the reserved resources remain idle beyond the time-out period.

13. A switched node for use in a multi-dimensional computer network, the switched node comprising:

(a) switching circuitry comprising more than two bi-directional ports for simultaneously transmitting data in multiple dimensions through the computer network, wherein each bi-directional port comprises an input port and an output port;

(b) a data buffer for buffering data;

(c) routing circuitry for routing data stored in the data buffer to a selected output port; and (d) a reservation facility for reserving resources within the switch node to support requests to transmit isochronous data, wherein:

the switched node receives a request packet to reserve resources to support transmitting isochronous data;

if the switched node comprises sufficient resources to support transmitting the isochronous data, the reservation facility reserves resources within the switched node to support transmitting the isochronous data, and the switched node transmits an acknowledge (ack) packet to a first neighboring node;

if the first neighboring node does not comprise sufficient resources to support transmitting the isochronous data, the switched node receives a negative-acknowledge (nack) packet from the first neighboring node, and the switched node transmits the ack packet to a second neighboring node.

14. The switched node as recited in claim 13, further comprising a disk for storing data and a head actuated over the disk for writing data to and reading data from the disk.

15. The switched node as recited in claim 14, wherein the reservation facility reserves resources associated with data read from the disk and written to the disk.

16. The switched node as recited in claim 13, wherein the request packet comprises a lease period, and the switched node automatically relinquishes the reserved resources when the lease period expires.

17. The switched node as recited in claim 13, wherein:

(a) a time-out period is associated with the reserved resources; and (b) the switched node automatically relinquishes the reserved resources if the reserved resources remain idle beyond the time-out period.

18. A computer network comprising:

(a) a plurality of nodes for transmitting isochronous data from a source node to a destination node;

(b) a request node for injecting a request packet into the network, the request packet specifying a request to transmit the isochronous data from one of a plurality of source nodes; and (c) routing circuitry for routing the request packet to at least one of the plurality of source nodes, wherein:

the source node determines whether it comprises sufficient resources to support transmitting the isochronous data;

if the source node comprises sufficient resources to support transmitting the isochronous data, the source node reserves resources to support transmitting the isochronous data, and transmits an acknowledge (ack) packet to a first neighboring node;

the first neighboring node determines whether it comprises sufficient resources to support transmitting the isochronous data;

if the first neighboring node comprises sufficient resources to support transmitting the isochronous data, the first neighboring node reserves resources to support transmitting the isochronous data, and transmits the ack packet to a node adjacent the first neighboring node; and if the first neighboring node does not comprise sufficient resources to support transmitting the isochronous data:

the first neighboring node transmits a negative-acknowledge (nack) packet to the source node; and the source node transmits the ack packet to a second neighboring node.

19. The computer network as recited in claim 18, wherein the resources comprise memory for buffering data.

20. The computer network as recited in claim 18, wherein the resources comprise network communication circuitry.

21. The computer network as recited in claim 20, wherein:

(a) the network circuitry comprises multi-port switching circuitry comprising a plurality of virtual lanes; and (b) the resources comprise at least one of the virtual lanes.

22. The computer network as recited in claim 18, wherein the routing circuitry routes the request packet to a plurality of source nodes.

23. The computer network as recited in claim 22, wherein:

(a) the routing circuitry transmits the request packet to a primary source node;

(b) the primary source node determines whether it comprises sufficient resources to support transmitting the isochronous data; and (c) if the primary source node does not comprise sufficient resources to support transmitting the isochronous data, the primary source node forwards the request packet to a secondary source node.

24. The computer network as recited in claim 22, wherein:

(a) the routing circuitry multicasting the request packet to the plurality of source nodes;

(b) each of the plurality of source nodes determines whether they comprises sufficient resources to support transmitting the isochronous data; and (c) at least two of the source nodes reserve resources to support transmitting the isochronous data.

25. The computer network as recited in claim 24, wherein the resources reserved in one of the source nodes are relinquished.

26. The computer network as recited in claim 22, wherein:

(a) the routing circuitry multicasting the request packet to the plurality of source nodes;

(b) each of the plurality of source nodes determines whether they comprises sufficient resources to support transmitting the isochronous data;

(d) a first node reserves resources in a first path of nodes between the first source node and the destination node;

(e) a second source node reserves resources in a second path of nodes between the second source node and the destination node; and (f) the resources reserved in the first path of nodes are relinquished.

27. The computer network as recited in claim 26, wherein the resources reserved in the first path of nodes are relinquished when a node is reached comprising resources reserved to support transmitting the isochronous data through the second path of nodes.

28. The computer network as recited in claim 18, wherein:

(a) the request packet comprises a lease period; and (b) the reserved resources are automatically relinquished when the lease period expires.

29. The computer network as recited in claim 18, wherein:

(a) a time-out period is associated with the reserved resources; and (b) the reserved resources are automatically relinquished if the reserved resources remain idle beyond the time-out period.

* * * * *